(12) United States Patent
Islinger et al.

(10) Patent No.: US 12,393,535 B2
(45) Date of Patent: Aug. 19, 2025

(54) FRAME REPLICATION AND ELIMINATION ON MICROCONTROLLER

(71) Applicant: Infineon Technologies AG, Neubiberg (DE)

(72) Inventors: Tobias Islinger, Höhenkirchen-Siegertsbrunn (DE); Harald Zweck, Munich (DE)

(73) Assignee: Infineon Technologies AG, Neubiberg (DE)

( * ) Notice: Subject to any disclaimer, the term of this patent is extended or adjusted under 35 U.S.C. 154(b) by 41 days.

(21) Appl. No.: 18/366,968

(22) Filed: Aug. 8, 2023

(65) Prior Publication Data

US 2025/0053527 A1 Feb. 13, 2025

(51) Int. Cl.
*G06F 13/28* (2006.01)

(52) U.S. Cl.
CPC ..................................... *G06F 13/28* (2013.01)

(58) Field of Classification Search
CPC ............................. G06T 15/005; H04L 45/18
See application file for complete search history.

(56) References Cited

U.S. PATENT DOCUMENTS

| 2004/0041813 A1* | 3/2004 | Kim | G06T 15/005 |
| | | | 345/519 |
| 2011/0069712 A1* | 3/2011 | Koch | H04L 12/462 |
| | | | 370/400 |
| 2017/0195222 A1* | 7/2017 | Schrum, Jr. | H04L 45/18 |
| 2019/0163362 A1* | 5/2019 | Carlough | G06F 3/0659 |
| 2020/0082396 A1* | 3/2020 | Chow | G06Q 20/1085 |
| 2020/0379922 A1* | 12/2020 | Kumar | G06F 12/0646 |

* cited by examiner

*Primary Examiner* — Getente A Yimer
(74) *Attorney, Agent, or Firm* — Eschweiler & Potashnik, LLC (57) ABSTRACT

Some aspects of the present disclosure relate to a network processor. The network processor includes a system bus, a central processing unit (CPU) coupled to the system bus, a random access memory (RAM) coupled to the CPU via the system bus; a plurality of network ports coupled to the CPU and the RAM; and a network bridge coupled between the CPU and the plurality of network ports. The network bridge includes a first transmit Direct Memory Access (DMA) circuit and a first transmit memory buffer coupled between the first transmit DMA circuit and a first network port, and a receive memory buffer and frame parser hardware arranged between the receive memory buffer and the system bus.

11 Claims, 7 Drawing Sheets

FIG. 7

FRAME REPLICATION AND ELIMINATION ON MICROCONTROLLER

BACKGROUND

Communication systems send messages between two or more communication devices. To send such messages, a source device (transmitter) often divides the message into smaller segments, and then transmits each of the smaller sections in corresponding packets over a communication medium. Thus, the packets, each including a smaller segment of the overall message, are then separately transmitted wirelessly (e.g., over the atmosphere), optically (e.g., over a fiber optic cable), and/or over a wire (e.g., copper wire, twisted pair of copper wires, or co-axial cable). Upon receiving the packets, a destination device (receiver) gathers the smaller segments of the message from the various packets and re-assembles the larger message.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware.

Figure 1:
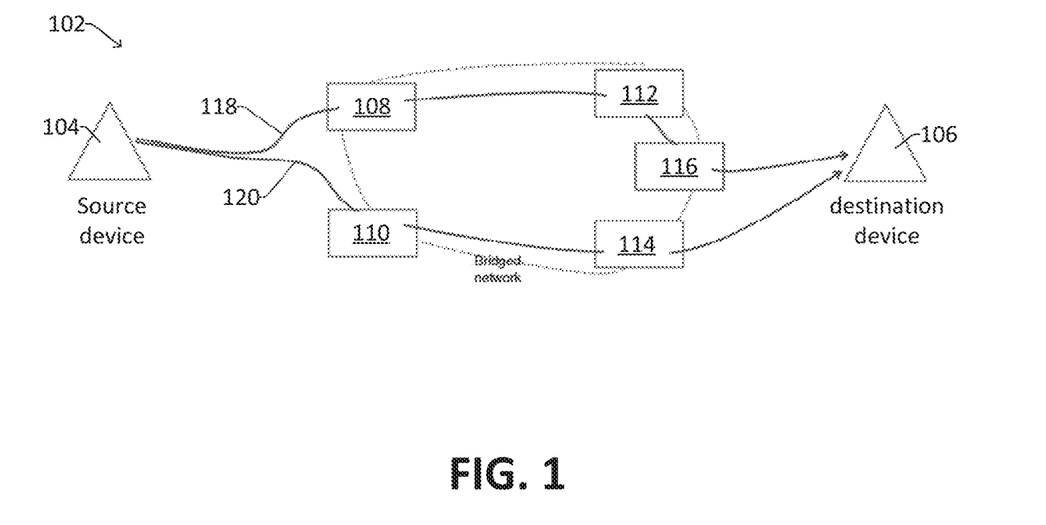
FIG. 1 illustrates an example communication network.

FIG. 1 shows an example of a communication network 100 that includes several communication devices 102. In FIG. 1's example, a first device of the communication devices 104 is hereby described as a source device, and a second device 106 is described as a destination device, and other devices 108-116 are described as intermediate devices; but it will be appreciated that each communication device 102 can act as a source device, destination device, and/or intermediate device, depending on its role in a given message exchange.

Each of the communication devices 102 has its own unique identifier/address, such as a Virtual Local Area Network (VLAN) address and/or a Media Access Control (MAC) address, which is common in IEEE 802 networking technologies, including Ethernet, Wi-Fi, and Bluetooth. To safely transmit a packet data from the source device 104 to the destination device 106, the source device 104 sends a packet specifying its own address and a destination address of the destination device to neighboring communication devices (e.g., 106, 108). Each neighboring device checks the destination address of the packet to determine if it is the intended recipient, and if not, forwards the packet on to the next devices in the communication network. Thus, in this example, when intermediate devices 106, 108 receive the packet addressed to destination 106, they determine that the packet is not addressed to them and forward the packet to their neighboring communication devices (e.g., 112, 114). In this way, the packet can make its way to the destination device 106 through various/different pathways 118, 120 in the network. This transmission over redundant pathways 118, 120 helps to ensure the message is safely received at the destination device 106, even if noise and/or device failures in the network cause some packets to get "dropped". To add further assurances that the message is safely received at the destination device, the source device can also transmit a given packets multiple times, for example, using a redundancy tag (R-tag) for example, as described in more detail below.

Figure 2:
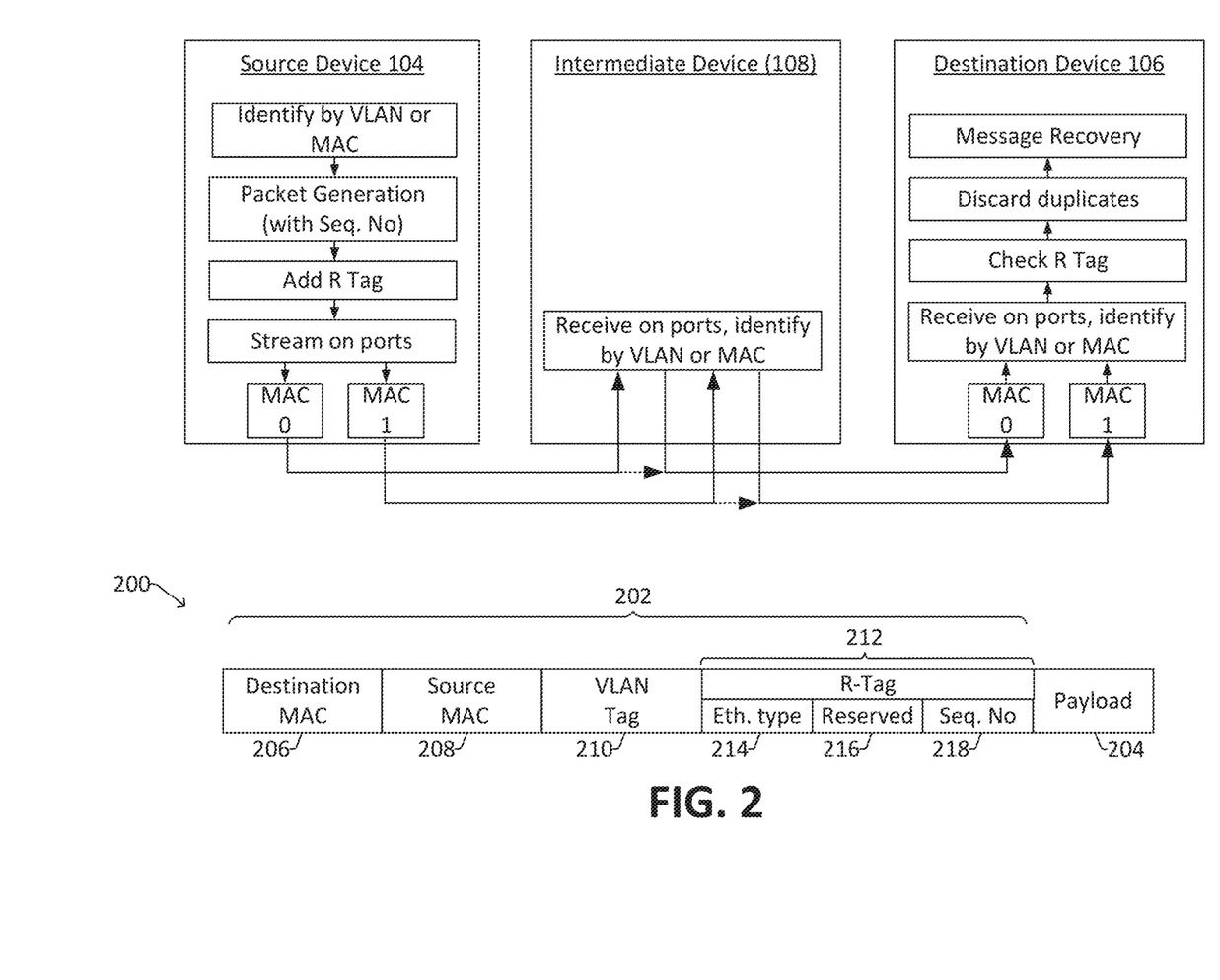
FIG. 2 illustrates a more detailed communication network.

FIG. 2 shows an example of how a source device 104 and destination device 106 can communicate via an intermediate device (e.g., 108) in more detail. The source device 104 can break a message into multiple message segments. The lower portion of FIG. 2 shows an example packet format. The packet 200 includes a header 202 and payload data 204 (which corresponds to a message segment). The header 202 includes a destination MAC 206, a source MAC 208, a VLAN tag 210, and an R-tag 212. The R-tag 212 can include an Ethernet type field 214 (e.g., 0xF1C1), a reserved field 216, and a sequence number field 218. To fill in the sequence number field 218, a different sequence number is generated for each message segment, such that each packet 200 includes its own sequence number. This packet 200 including the payload 204 and R-Tag 212 is then sent to over the communication medium to neighbouring communication devices. In some cases where stream redundancy is used, multiple copies are generated for each packet in a stream to be forwarded via multiple distinct paths, respectively.

Upon receiving each packet 200, the other communication devices identify the stream of which the received packet belongs to. Thus, the intermediate device 108 examines the destination MAC 206 and/or VLAN tag 208. Upon the intermediate device 108 determining that the intermediate device is not the intended destination address, the intermediate device forwards the packet along to neighbouring communication devices, until eventually the packet reaches the destination address 106.

Upon receiving each packet 200, the destination device 106 also examines the destination MAC 106 and VLAN tag 210 and determines that it is the intended destination. The destination device 106 also extracts the sequence number 218 in the received packet, and compares the sequence number of the received packet to the previously received sequence numbers. When the sequence number is a first instance when received as a packet, the packet is accepted; whereas if the sequence number is a duplicate (e.g., another packet with the same sequence number has already been received) then the packet is a redundant packet and is discarded. The destination device 106 can also analyse the sequence numbers of a stream of packets to determine whether all packets in the stream have been received, and can request retransmission of any or all packets as appropriate.

Notably, this scheme requires that the destination device 106 be able to dispose of and/or ignore any redundant packets to correctly re-assemble the original message. In a similar vein, the source device 106 may at times be required to transmit duplicate packets to reliably transmit a message. While several communication protocols, such as IEEE 802.1CB for example, specify mechanisms to send streams on redundant paths through a communication network, some approaches to achieve this use significant hardware and/or software resources. Accordingly, the present disclosure provides improved techniques for carrying out such communication protocols on a microcontroller. In particular, the present disclosure provides efficient ways of transmitting redundant packets and/or and receiving packets in a way to limit overhead of discarding redundant packets.

Figure 3:
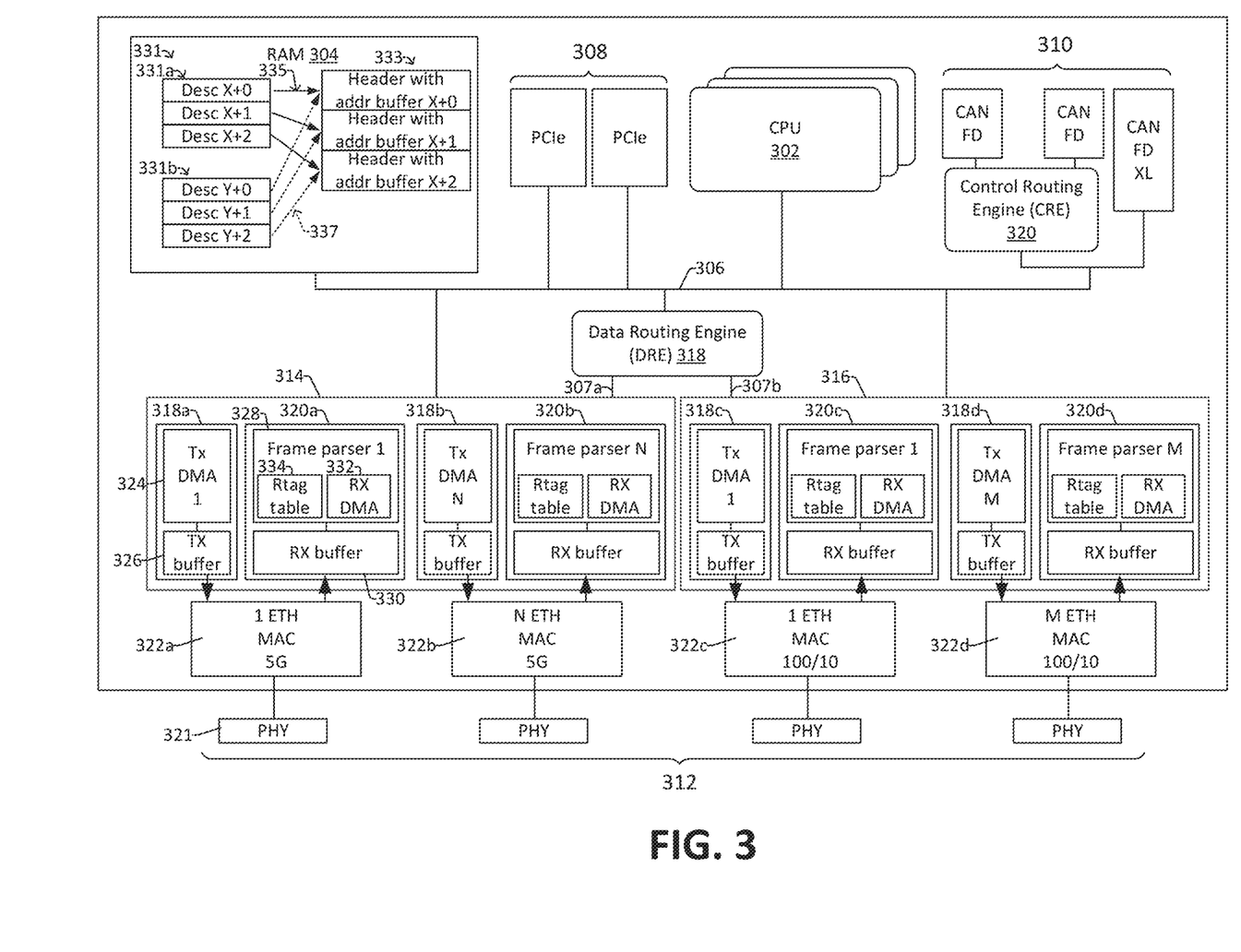
FIG. 3 illustrates a microcontroller including one or more Direct Memory Access (DMA) circuits in accordance with some examples.

FIG. 3 shows a microcontroller 300 in accordance with some examples. As will be appreciated in more detail below, the microcontroller includes one or more network bridges (e.g., 314, 316) capable of duplicating packets for transmission and/or discarding redundant packets in a way that improves overall efficiency. In particular, the network bridges can make use of Direct Memory Address (DMA) circuits to reduce bottlenecks within the microcontroller. In some instances, the microcontroller can be included on an integrated circuit. The integrated circuit can include a single monocrystalline silicon substrate arranged within a package, and including transistors in the substrate and interconnect wires (e.g., copper lines) over the substrate coupling transistors to one another within the package. The integrated circuit can also include multiple substrates that are stacked vertically over one another to establish a three-dimensional IC, and/or can include multiple chips on a printed circuit board or otherwise electrically coupled together.

As shown, the microcontroller 300 includes one or more central processing units (CPUs) 302 and memory (e.g., random access memory (RAM) 304), which are connected by a system bus 306. Various ports are also coupled to system bus and enable the microcontroller to communicate with other devices, for example to achieve a communication system as describe with regards to FIGS. 1-2. In FIG. 3's example, the microcontroller includes Peripheral Component Interconnect express (PCIe) ports 308 for connecting the microcontroller to various peripheral devices. The microcontroller also includes sensor ports 310, such as Controller Area Network Flexible Data-Rate (CAN FD) ports, for broadcasting sensor data and control information on interconnections between the microcontroller 300 and other electrical components. Each CAN FD port can be coupled to two copper wires, and is often used in modern high performance vehicles. Ethernet ports 312 are also present, such as 5G Ethernet ports and 10/100 Ethernet MAC ports. A first network bridge 314 is coupled to the system bus 306 and coordinates communication among the 5G Ethernet ports (optionally via a first network bus 307a), and a second network bridge 316 is coupled to the system bus 306 and coordinates communication among the 10/100 Ethernet MAC ports (optionally via a second network bus 307b). A data routing engine (DRE) circuit 318 is coupled to the CPU 302 via the system bus 306, and can be arranged between the system bus 306 and the first and second network bridges 314, 316. A control routing engine (CRE) circuit 320 is also coupled to the CPU 302 via the system bus 306, and can be arranged between the system bus 306 and the sensor ports 310.

Each network bridge 314, 316 can include separate transmit paths (e.g., 318a-318d) for transmitting packets over each network port (e.g., 322a-322d, respectively), as well as separate receive paths (e.g., 320a-320d) for receiving network packets over each network port (e.g., 322a-322d, respectively). Thus, in the example of FIG. 3, the first network bridge 314—which is illustrated as coordinating functions for N MAC 5G Ethernet ports (where N is an integer)—includes a first transmit path 318a and a first receive path 320a corresponding to a first network port 322a; and includes a second transmit path 318b and a second receive path 320b corresponding to a second network port 322b. Each transmit path includes a Tx Direct Memory Access (DMA) circuit (e.g., 324) and a transmit buffer (e.g., 326). Each receive path includes frame parser hardware 328, and a receive buffer 330; where the frame parser hardware 328 includes an Rx DMA circuit 332 and an R-tag table 334. The second network bridge 316—which is illustrated as coordinating functions for M 100/10 Ethernet MAC ports (where M is an integer, and M can be equal to or different from N)—includes similar circuitry.

To transmit data, software, such as an application, running on the CPU 302 determines a message is to be sent to a destination device. The application thus provides the message to a network stack, such as an Open System Interconnect (OSI) model or TCP/IP network stack, included in operating system software running on the CPU 302. The network stack then generates packets to be transmitted to the destination device. In particular, to facilitate transmission of the desired packets the CPU 302 writes a series of descriptors 331 in the memory 304. Each descriptor can include a descriptor header and several other fields, which provide instructions and data for each Tx DMA to perform packet processing. The descriptors 331 can take the form of a linked list, where one descriptor has a field pointing to the next descriptor in the linked list. In some cases, one or more descriptor fields can contain actual data to be processed, but in other cases the descriptor fields contain an address—sometimes referred to as a pointer—that points to the location in memory 304 where data is to be processed. The CPU also writes data 333 that corresponds to a packet header and payload data to the memory, and often the descriptor fields point to the address of the packet header and payload data.

After the CPU 302 has setup descriptor(s) 331 and the data 333 corresponding to the packet header and payload data, the CPU determines which port the message is to be transmitted from. Then, the CPU 302 and/or DRE 318 transmits a signal over the system 306 bus to "kick off" the DMA corresponding to the port. For example, if a packet or series of packets is to be transmitted via Ethernet port 1 (322a), the CPU 302 and/or DRE 318 will setup a first descriptor(s) 331a and/or data 333 to specify Ethernet port 1 (322a), and send the address of the first descriptor 331a to a control register of the first TX DMA circuit 324. Once the DMA 324 receives this signal, the DMA 324 will retrieve the descriptor(s) 331a and autonomously (e.g., without hand-holding from the CPU 302) gather the header and payload data (333) from the RAM to transmit the packet to the Tx buffer 326 and/or over the first port 322a. When the DMA completes processing of the packet, the DMA can flag an interrupt so the CPU 302 and/or Data Routing engine 318 (and/or an interrupt controller module—not shown) can service the interrupt and then await another packet transmission request from the CPU 302 and/or DRE 318.

Further, to expedite re-transmission of redundant/re-transmitted packets, the descriptors can be re-used for multiple ports. For instance, in some cases, a packet may be re-transmitted using two different ports—for example, port 322a and 322b. If the CPU 302 has already setup the first descriptor(s) 331a to transmit a packet over the first port 322a, the CPU can efficiently retransmit the packet (even including the same sequence number) over the second port 322b by setting the pointers of a second descriptor 331b to the locations where data 333 corresponding to the packet header and payload data are stored (see pointers 337).

Notably, because the payload data and/or header 333 may be quite large, gathering the packet header and payload data 333 may take multiple accesses, and therefore, the CPU 302 reduces its own loading by offloading this task to the first DMA circuit 324. This way the first DMA circuit 324 can monitor bus accesses and interface to the ETH MAC port 322a without requiring management from the CPU. Further, replicating the packets by using descriptors saves additional overhead, and can help improve overall system efficiency.

When acting as a receiver, the network port 322a can receive an incoming packet, and write the received packet to its corresponding receive buffer 330. Somewhat akin to the TX DMA circuit 324, the CPU 302 sets up descriptors for the frame parser hardware 328 based on network operating conditions. Thus, the frame parser hardware 328, which includes Rx DMA circuit 332, then retrieves the incoming packet from the RX buffer 330 and analyzes the contents of the packet based on descriptors stored in memory 304. For example, the frame parser hardware 328 can search for the R-tag within a packet and compare the R-tag in the packet to a list of previously received R-tags stored in the R-tag table 334. The first time the R-tag is received and stored in the R-tag table 334, the frame parser hardware 328 can write the contents of the packet to the system memory 304, depending on other fields set in the descriptor. If the R-tag in the packet is duplicative with an R-tag that is already stored in the R-tag table 334, then the packet can be ignored/discarded. For example, the packet can be left in the receive buffer 330 and not written to the system memory 304 by the frame parser hardware 328, which saves some system memory and more importantly reduces bus accesses over the various busses and thereby promotes efficiency improvements for the system.

Figure 4:
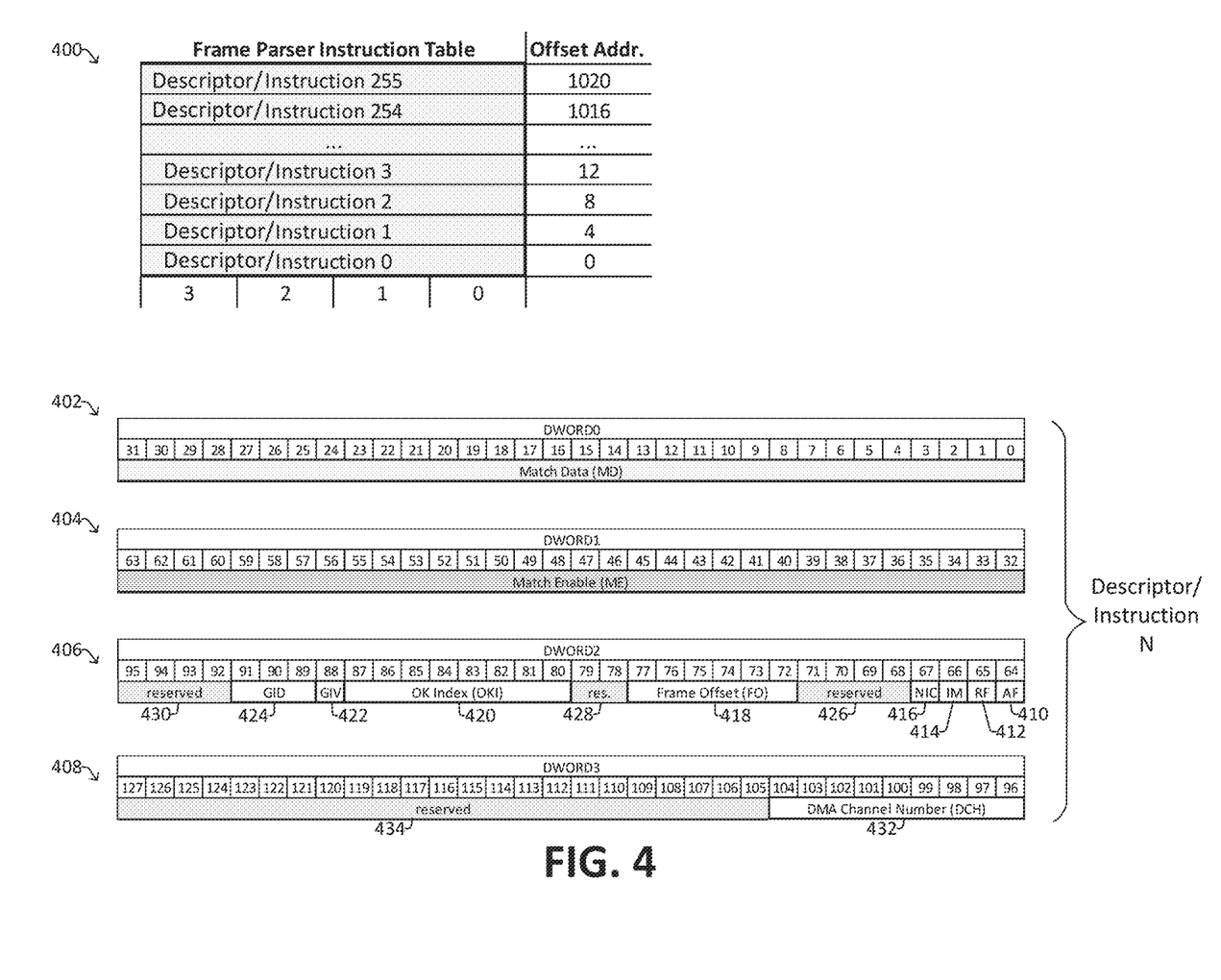
FIG. 4 illustrates a detailed example of a descriptor format for processing packets in accordance with some examples.

FIG. 4 illustrates a more detailed example of frame parser instruction table and a descriptor format that promotes processing received packets and selectively discarding redundant packets in an efficient manner. The upper portion of FIG. 4 illustrates a frame parser instruction table 400, such as could be stored in memory (e.g., RAM 304 of FIG. 3). The framer parser instruction table 400 is organized as 1024 32-bit digital words, and four of these 32-bit digital words form one descriptor, which acts as a DMA instruction. Each 32-bit digital word within the table can include four frame offsets (e.g., 0, 1, 2, 3); and the As shown in the lower portion of FIG. 4, each descriptor or "instruction" includes four 32-bit digital words 402-408. The first digital word 402 (e.g., DWORD0) is 32-bits of so-called match data (MD). Thus, MD defines up to 4 bytes of data within the packet for comparison.

The second digital word 408 (E.g., DWORD1) is 32-bits for match enable (ME), which provides a bit-wise enabling of the comparison of the Match Data. ME can be less than or equal to MD. For example, there could be four bytes of data within a packet for comparison (MD=4), but only 2 bits of those bits can be compared (ME=2).

The third digital word 406 (e.g., DWORD2) includes a number of different fields, including Accept Frame (AF) 410, Reject Frame (RF) 412, Inverse Match (IM) 414, Next Instruction Control (NIC) 416, Frame Offset (FO) 418, and OK Index (OKI) 420. A Gate-ID valid field (GIV) 422, and Gate-ID field (GID) 424 can also be included. When GIV is 1 and AF is 1, the packet is further checked against a stream gate filter, given by GID. GID represents the Stream-Gate filter number to be applied on the packet when GIV=1. Other fields 426, 428, and 430 are reserved. The Accept Frame (AF) field determines whether or not a received packet is accepted/forwarded to the network bridge or whether the received packet is discarded, and constitutes an end of the linked list for this packet and/or packet stream for the frame parser. The Reject Frame (RF) field determines whether or not a received packet is rejected/discarded before being passed through the network bridge, and also constitutes an end of the linked list for this packet and/or packet stream for the frame parser. If AF=RF=1, then the Frame Parser is disabled for this packet and/or stream. Inverse Match (IM) specifies whether a comparison result gets inverted before evaluation. Next Instruction Control can be set to 0 or 1, and controls how the DMA moves from one descriptor to the next descriptor in time. If NIC is set to 1, then upon completion of processing a first descriptor, the DMA will move onto the next consecutive descriptor (e.g., next consecutive address) in the instructor table. In contrast, if NIC is set to 0, then upon completion of processing a first descriptor, the DMA will jump to execute a second descriptor that is located at the OK Index (OKI), which is generally a non-consecutive address from the end of the first descriptor. The Frame Offset field (FO) specifies an offset (e.g., a bit position) within a frame.

The fourth digital word 408 (e.g., DWORD3) includes a DMA Channel Number (DCH) 432 that defines the network Bridge—also referred to as a DMA channel in some contexts—where the packet is forwarded to (AF=1, match=PASS). This channel number can correspond to a MAC Ethernet address or a virtual local area network (VLAN) address. If DCH=0 (no bits set) then an accepted frame is forwarded to Bridge. Channel0.

Figure 5:
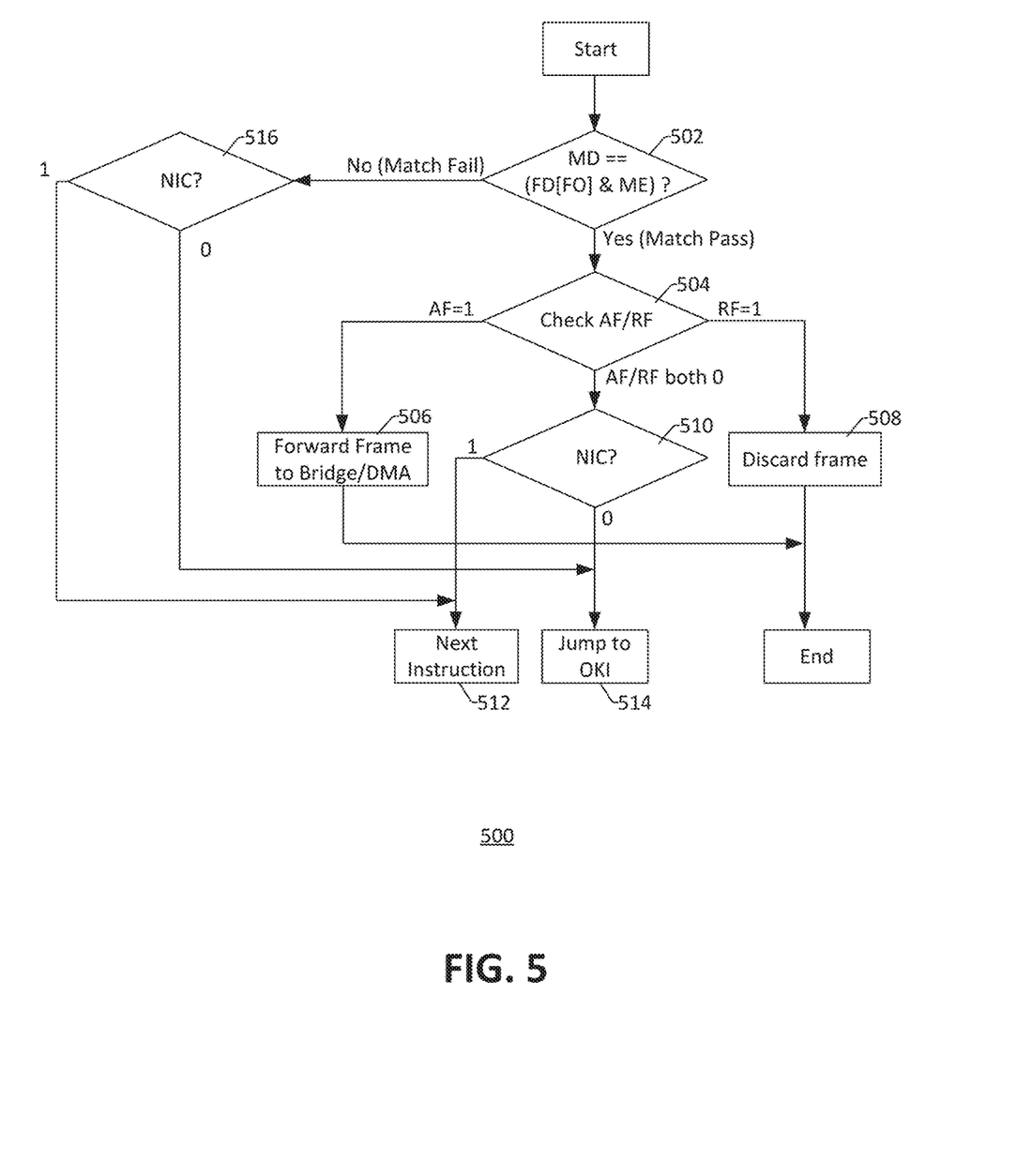
FIG. 5 illustrates a method of packet processing using the descriptor format of FIG. 4.

FIG. 5 illustrates a method of packet processing using the descriptor format of FIG. 4. It will be appreciated that various methods are illustrated and described herein as a series of operations or events, but the illustrated ordering of such operations or events is not limiting. For example, some operations or events may occur in different orders and/or concurrently with other operations or events apart from those illustrated and/or described herein. Also, some illustrated operations or events are optional to implement one or more aspects or examples of this description. Further, one or more of the operations or events depicted herein may be performed in one or more separate operations and/or phases. In some examples, the methods described above may be implemented in a computer readable medium using instructions stored in a memory, but may also be carried out by hardware and/or a combination of hardware and software.

At 502, the method determines if MD==(FD[FO]*ME). In other words, the method determines if the match data (MD) is equal to the Frame Data (FD) at the Frame Offset (FO) and Match Enable (ME).

If the match passes (Yes from 502), then the method proceeds to 504 and checks whether the AF/RF (Accept Frame/Reject Frame) fields are set. The AF/RF fields can be set within the frame parser based on whether a sequence number in a given packet is already present (redundant) from a previously stored packet in the R-Tag table (e.g., 334) or whether the sequence number is one of first impression in the R-Tag table. If the sequence number of already present in the R-Tag table (e.g., 334), then the RF field for the next descriptor can be set to 1. On the other hand, if the sequence number in the present packet is not present in the R-Tag table, then the packet is a "new" (e.g., non-redundant) packet and the AF is set to 1.

If AF=1, the method proceeds to 506, and the received packet (which passes the match) is forwarded to the network bridge. Thus, the received packet is forwarded to Data Routing Engine (e.g., 318 in FIG. 3) and/or system memory (e.g., 304 in FIG. 3) and will be passed up the stack to be gathered as part of the message.

On the other hand, if RF=1, then the method proceeds to 508 and the frame is discarded/rejected. Thus, the frame will not be passed up the stack because it is redundant, and the frame parser saves the time and bus accesses associated with further processing the frame.

If AF/RF are both 0, then the method continues to 510 and evaluates whether the NIC (Next Instruction Control) field is set or not. If NIC=1, then the method proceeds to 512 and the descriptor having the next consecutive address within the descriptor table is processed. On the other hand, if NIC=0, then the method proceeds to 514 and the DMA jumps to the location of the descriptor at OKI (Instruction index to jump to), and this next descriptor will be processed according to this method again.

If there is a match fail (No at 502), then the method proceeds to 516 and evaluates whether the NIC field is set or not. If NIC=1, then the method proceeds to 514 and the DMA jumps to the location of the descriptor at OKI. On the other hand, if NIC=0, then the method proceeds to 512 and the descriptor having the next consecutive address within the descriptor table is processed.

Figure 6:
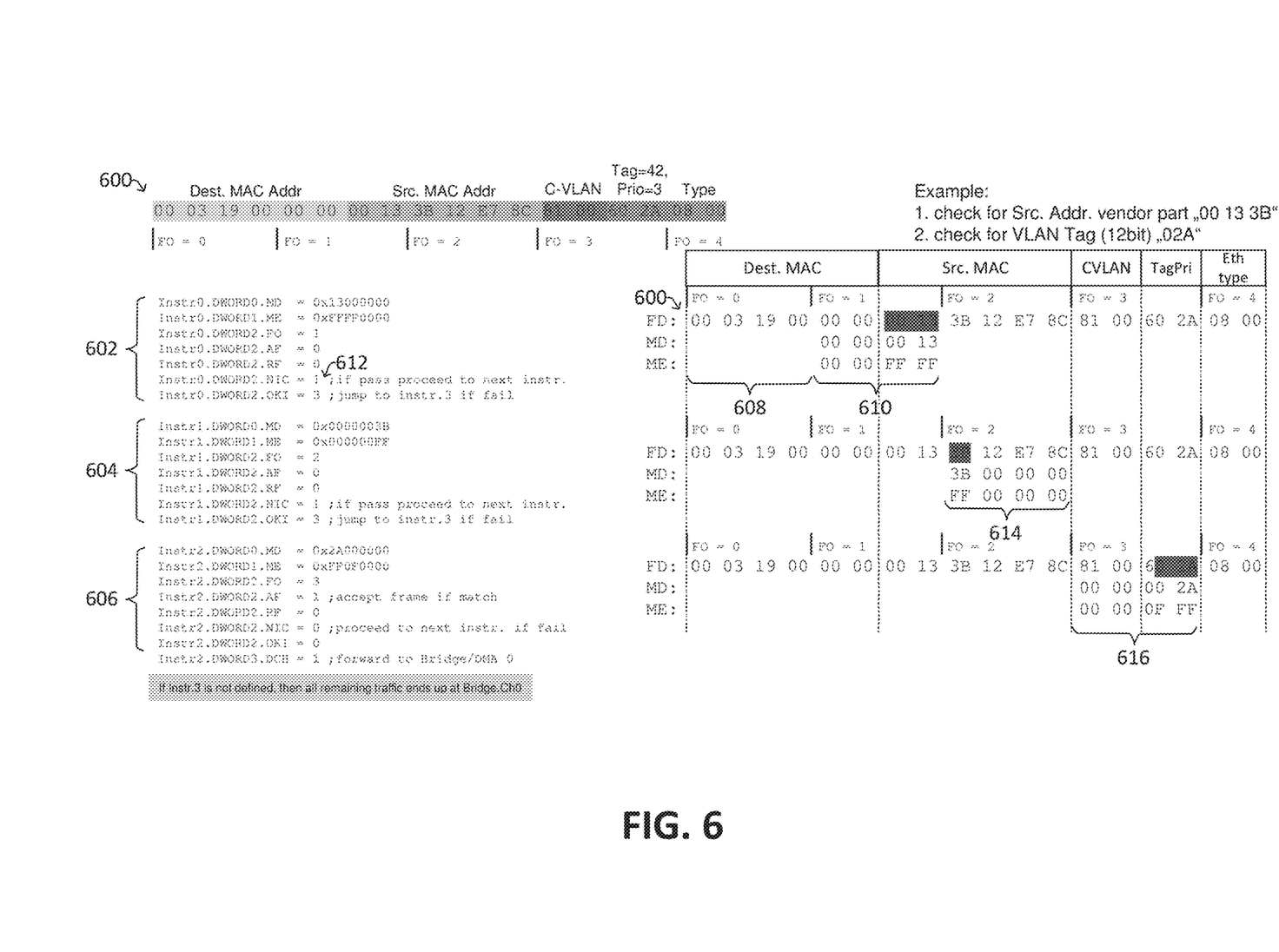
FIG. 6 illustrates a method of packet processing using the descriptor format of FIGS. 4-5.

FIG. 6 illustrates a method of packet processing using the descriptor format of FIGS. 4-5. In particular, the example of FIG. 6 shows how frame data (FD) for a single Ethernet frame 600 is processed using three DMA descriptors/instructions (e.g., Instr0 602, Instr1 604, and Instr2 606), which are arranged as a linked list.

As shown in the right hand portion of FIG. 6, the Ethernet frame can include multiple bytes of data that are organized into various frame offsets (FO), with each FO including four bytes of data. Thus, the first frame offset FO=0 (608) includes bytes 00 03 19 00; the second frame offset FO=1 (610) includes bytes 00 00 00 13; and so on. Thus, when the DMA executes the first descriptor 602, the FO field (Instr0.Dword2.FO)=1, such that the frame parser hardware of the DMA retrieves the data corresponding to the second frame offset FO=1. Further, the first descriptor 602 specifies the DMA is looking for match data (MD) of 0x13000000 and because the match enable (ME) is set to 0xFFFF0000, the first instruction will compare data bits in the actual frame which correspond to F in the ME field. So on the right hand portion of FIG. 6 for 602, the DMA retrieves the Ethernet frame and compares 00 13 in the actual Ethernet frame data (FD) to 00 13 in the Match data (MD) of Instr0. In this example, the data is bitwise identical, so this is deemed to be a "pass", and because NIC in instruct0 is set to 1 (see 612), the DMA proceeds to the next instruction (Instr. 1).

The second instruction 604 then increments the frame offset (FO=2), and now determines whether a byte specified by the Match Enable (0x000000FF) in the frame data FD matches the specified match data MD of 0x0000003B (see 614). Again, in this case, the data 3B is a match, and thus, this is deemed to be a "pass". Accordingly, because NIC for the second instruction 604 is set to 1, the DMA proceeds to the next instruction.

The third instruction 606 again increments the frame offset (FO=3), and determines whether a byte specified by the Match Enable (0xFF0F0000) in the frame data FD matches the specified match data MD of 0x2A000000 (see 616). Again, in this case, the data 2A0 is a match, and thus, this is deemed to be a "pass". Accordingly, because NIC for the third instruction 606 is set to 0, this instruction represents the end of the linked list for the instructions 602-606, and the DMA forwards the Ethernet frame to DMA channel 1 (DCH=1 in third instruction 606). It will be appreciated that this is merely an example list of instructions, and other instructions could be written to perform any number of retransmission tasks, elimination of duplicate packets, etc. Also, the endianess and other features illustrated in FIG. 6 are merely examples, and other variations are contemplated as falling within the present disclosure.

Figure 7:
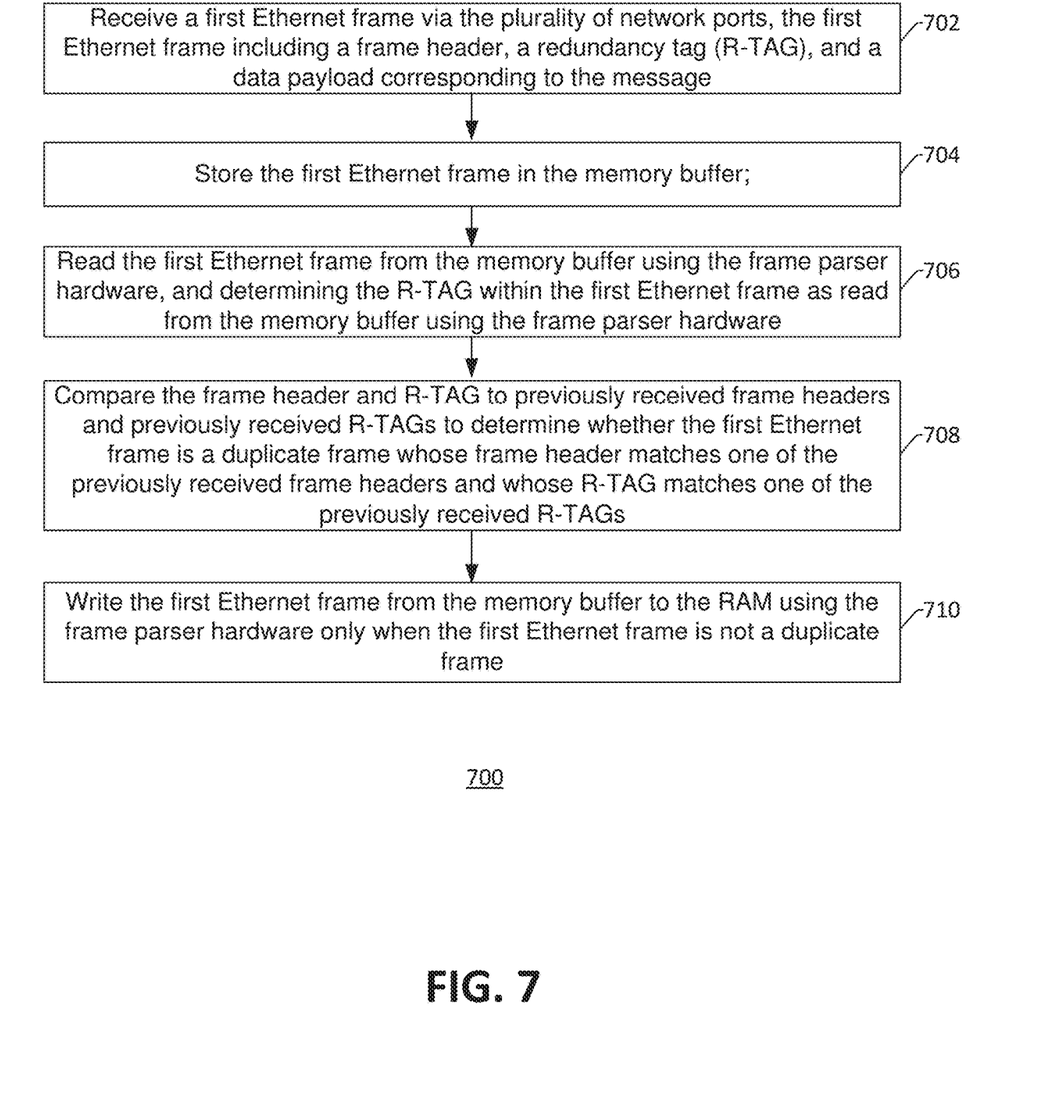
FIG. 7 illustrates a method of packet processing according to some examples of the present disclosure.

FIG. 7 illustrates another method of packet processing in accordance with some examples of this disclosure. The method is performed on a network processor including a plurality of network ports, a memory buffer coupled to the plurality of ports, a frame parser hardware coupled to the memory buffer, and a random access memory (RAM) coupled to between the frame parser hardware and a central processing unit (CPU).

At 702, the network processor receives a first Ethernet frame via the plurality of network ports. The first Ethernet frame includes a frame header, a redundancy tag (R-TAG), and a data payload corresponding to the message.

At 704, the first Ethernet frame is stored in the memory buffer.

At 706, the first Ethernet frame is read from the memory buffer using the frame parser hardware, and the frame parser hardware determines the R-TAG within the first Ethernet frame as read from the memory buffer.

At 708, the frame parser hardware compares the frame header and R-TAG to previously received frame headers and previously received R-TAGs to determine whether the first Ethernet frame is a duplicate frame whose frame header matches one of the previously received frame headers and whose R-TAG matches one of the previously received R-TAGs.

At 710, the first Ethernet frame is written from the memory buffer to the RAM only when the first Ethernet frame is not a duplicate frame. If the first Ethernet frame is a duplicate frame, then the first Ethernet frame is discarded and/or ignored, and for example, in not written to the RAM to reduce overhead.

Thus, some aspects of the present disclosure relate to a method to transmit a message using a network processor. The network processor includes a central processing unit (CPU), a plurality of network ports coupled to the CPU, a network bridge coupled between the CPU and the plurality of network ports, and a memory coupled to the CPU and the network bridge. The method includes the acts of: setting up frame data in the memory, where the frame data includes a frame header, a redundancy tag (R-TAG), and a data payload corresponding to the message; using a first Direct Memory Access (DMA) circuit in the network bridge to generate a first frame for transmission over a first network port of the plurality of network ports; and using a second DMA circuit in the network bridge to duplicate the first frame for transmission over a second network port of the plurality of network ports.

In some examples, the first DMA circuit is coupled to the first network port and the second DMA circuit is coupled to the second network port.

In some examples, the first DMA circuit is configured to read a first descriptor from the memory, and is further configured to retrieve the frame header, the R-TAG, the data payload from the memory based on the first descriptor to generate the first frame for transmission over the first network port. The second DMA circuit is configured to read the first descriptor or read a second descriptor from the memory, and is further configured to retrieve the frame header, the R-TAG, the data payload from the memory based on the first descriptor or the second descriptor to generate a second frame, which is a duplicate of the first frame, for transmission over the second network port.

In some examples, the frame header, the R-Tag, and the data payload are identical for the first frame and the second frame.

In some examples, the first descriptor includes a first field defining multiple bytes of compare data; a second field that enables bitwise comparison of the compare data; a third field including an accept frame bit, a reject frame bit, and a next instruction control bit that specifies whether to process with a next sequential instruction in the memory or whether to jump to a non-sequential instruction in the memory; and a fourth field that specifies the first network port or the second network port.

Further, some aspects of the present disclosure relate to a method to receive a message using a network processor. The network processor includes a plurality of network ports, a memory buffer coupled to the plurality of network ports, a frame parser hardware coupled to the memory buffer, and a random access memory (RAM) coupled to both the frame parser hardware and a central processing unit (CPU). The method includes the following acts: receiving a first Ethernet frame via the plurality of network ports, the first Ethernet frame including a frame header, a redundancy tag (R-TAG), and a data payload corresponding to the message; storing the first Ethernet frame in the memory buffer; reading the first Ethernet frame from the memory buffer using the frame parser hardware, and determining the R-TAG within the first Ethernet frame as read from the memory buffer using the frame parser hardware; comparing the frame header and the R-TAG to previously received frame headers and previously received R-TAGs to determine whether the first Ethernet frame is a duplicate frame whose frame header matches one of the previously received frame headers and whose R-TAG matches one of the previously received R-TAGs; and writing the first Ethernet frame from the memory buffer to the RAM only when the first Ethernet frame is not a duplicate frame.

In some examples, the frame parser hardware reads the first Ethernet frame and determines the R-TAG within the first Ethernet frame by using a first descriptor. The first descriptor includes a first field defining multiple bytes of compare data; a second field that enables bitwise comparison of the compare data; a third field including an accept frame bit, a reject frame bit, and a next instruction control bit that specifies whether to process with a next sequential instruction in the RAM or whether to jump to a non-sequential instruction in the RAM; and a fourth field that specifies a network port on which the first Ethernet frame was received.

Further, some aspects of the present disclosure relate to a network processor, including a system bus; a central processing unit (CPU) coupled to the system bus; a random access memory (RAM) coupled to the CPU via the system bus; a plurality of network ports coupled to the CPU and the RAM; and a network bridge coupled between the CPU and the plurality of network ports. The network bridge includes a first transmit Direct Memory Access (DMA) circuit and a first transmit memory buffer coupled between the first transmit DMA circuit and a first network port, and a receive memory buffer and frame parser hardware arranged between the receive memory buffer and the system bus.

In some examples, the first transmit DMA circuit is configured to read a first descriptor from the RAM, and is further configured to retrieve a frame header, a redundancy tag (R-TAG), and data payload from the RAM based on the first descriptor to generate a first frame in the first transmit memory buffer for transmission over the first network port.

In some examples, the network processor further includes a second transmit DMA circuit and a second transmit memory buffer coupled between the second transmit DMA circuit and a second network port. The second DMA circuit is configured to read the first descriptor or read a second descriptor from the RAM, and is further configured to retrieve the frame header, the R-TAG, the data payload from the RAM based on the first descriptor or the second descriptor to generate a second frame for transmission over the second network port.

In some examples, the frame header, the R-Tag, and the data payload are identical for the first frame and the second frame.

In some examples, the first descriptor includes a first field defining multiple bytes of compare data; a second field that enables bitwise comparison of the compare data; a third field including an accept frame bit, a reject frame bit, and a next instruction control bit that specifies whether to process with a next sequential instruction in the RAM or whether to jump to a non-sequential instruction in the RAM; and a fourth field that specifies the first network port.

In some examples, the first network port is configured to receive an Ethernet frame and store the Ethernet frame in the receive memory buffer, wherein the Ethernet frame includes a frame header, a redundancy tag (R-TAG), and a data payload. The frame parser hardware is configured to read the Ethernet frame from the receive memory buffer, and compare the frame header and the R-TAG to previously received frame headers and previously received R-TAGs to determine whether the Ethernet frame is a duplicate frame whose frame header matches one of the previously received frame headers and whose R-TAG matches one of the previously received R-TAGs.

In some examples, the frame parser hardware is configured to write the Ethernet frame from the receive memory buffer to the RAM only when the Ethernet frame is not a duplicate frame.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method to transmit a message using a network processor, the network processor including a central processing unit (CPU), a plurality of network ports coupled to the CPU, a network bridge coupled between the CPU and the plurality of network ports, and a memory coupled to the CPU and the network bridge, the method comprising:
setting up frame data in the memory, the frame data including a frame header, a redundancy tag (R-TAG), and a data payload corresponding to the message;
using a first Direct Memory Access (DMA) circuit in the network bridge to generate a first frame for transmission over a first network port of the plurality of network ports;
using a second DMA circuit in the network bridge to duplicate the first frame for transmission over a second network port of the plurality of network ports; and
wherein the first DMA circuit is directly coupled to the first network port and the second DMA circuit is directly coupled to the second network port;
wherein the first DMA circuit is configured to read a first descriptor from the memory, and is further configured to retrieve the frame header, the R-TAG, the data payload from the memory based on the first descriptor to generate the first frame for transmission over the first network port; and
wherein the second DMA circuit is configured to read the first descriptor or read a second descriptor from the memory, and is further configured to retrieve the frame header, the R-TAG, the data payload from the memory based on the first descriptor or the second descriptor to generate a second frame, which is a duplicate of the first frame, for transmission over the second network port.

2. The method of claim 1, wherein the frame header, the R-Tag, and the data payload are identical for the first frame and the second frame.

3. The method of claim 1, wherein the first descriptor comprises:
a first field defining multiple bytes of compare data;
a second field that enables bitwise comparison of the compare data;
a third field including an accept frame bit, a reject frame bit, and a next instruction control bit that specifies whether to process with a next sequential instruction in the memory or whether to jump to a non-sequential instruction in the memory; and
a fourth field that specifies the first network port or the second network port.

4. A method to receive a message using a network processor, the network processor including a plurality of network ports, a memory buffer coupled to the plurality of network ports, a frame parser hardware coupled to the memory buffer, and a random access memory (RAM) coupled to both the frame parser hardware and a central processing unit (CPU), the method comprising:
receiving a first Ethernet frame via the plurality of network ports, the first Ethernet frame including a frame header, a redundancy tag (R-TAG), and a data payload corresponding to the message, wherein the R-TAG includes a sequence number field that is generated for each message segment of a stream of packets;
storing the first Ethernet frame in the memory buffer;
reading the first Ethernet frame from the memory buffer using the frame parser hardware, and determining the R-TAG within the first Ethernet frame as read from the memory buffer using the frame parser hardware;
comparing the frame header and the R-TAG to previously received frame headers and previously received R-TAGs to determine whether the first Ethernet frame is a duplicate frame whose frame header matches one of the previously received frame headers and whose R-TAG matches one of the previously received R-TAGs; and
writing the first Ethernet frame from the memory buffer to the RAM only when the first Ethernet frame is not a duplicate frame;
wherein the frame parser hardware reads the first Ethernet frame and determines the R-TAG within the first Ethernet frame by using a first descriptor, the first descriptor comprising:
a first field defining multiple bytes of compare data;
a second field that enables bitwise comparison of the compare data;
a third field including an accept frame bit, a reject frame bit, and a next instruction control bit that specifies whether to process with a next sequential instruction in the RAM or whether to jump to a non-sequential instruction in the RAM; and
a fourth field that specifies a network port on which the first Ethernet frame was received.

5. A network processor, comprising:
a system bus;
a central processing unit (CPU) coupled to the system bus;
a random access memory (RAM) coupled to the CPU via the system bus;
a plurality of network ports coupled to the CPU and the RAM; and
a network bridge coupled between the CPU and the plurality of network ports, the network bridge comprising: a first transmit Direct Memory Access (DMA) circuit and a first transmit memory buffer directly coupled between the first transmit DMA circuit and a first network port, and a receive memory buffer and frame parser hardware arranged between the receive memory buffer and the system bus;
wherein the first network port is configured to receive an Ethernet frame and store the Ethernet frame in the receive memory buffer, the Ethernet frame including a frame header, a redundancy tag (R-TAG), and a data payload;
wherein the frame parser hardware is configured to read the Ethernet frame from the receive memory buffer, and compare the frame header and the R-TAG to previously received frame headers and previously received R-TAGs to determine whether the Ethernet frame is a duplicate frame whose frame header matches one of the previously received frame headers and whose R-TAG matches one of the previously received R-TAGS.

6. The network processor of claim 5:
wherein the first transmit DMA circuit is configured to read a first descriptor from the RAM, and is further configured to retrieve a frame header, a redundancy tag (R-TAG), and data payload from the RAM based on the first descriptor to generate a first frame in the first transmit memory buffer for transmission over the first network port.

7. The network processor of claim 6, further comprising:
a second transmit DMA circuit and a second transmit memory buffer coupled between the second transmit DMA circuit and a second network port;
wherein the second DMA circuit is configured to read the first descriptor or read a second descriptor from the RAM, and is further configured to retrieve the frame header, the R-TAG, the data payload from the RAM based on the first descriptor or the second descriptor to generate a second frame for transmission over the second network port.

8. The network processor of claim 7, wherein the frame header, the R-Tag, and the data payload are identical for the first frame and the second frame.

9. The network processor of claim 6, wherein the first descriptor comprises:
a first field defining multiple bytes of compare data;
a second field that enables bitwise comparison of the compare data;
a third field including an accept frame bit, a reject frame bit, and a next instruction control bit that specifies whether to process with a next sequential instruction in the RAM or whether to jump to a non-sequential instruction in the RAM; and
a fourth field that specifies the first network port.

10. The network processor of claim 5, wherein the frame parser hardware is configured to write the Ethernet frame from the receive memory buffer to the RAM only when the Ethernet frame is not a duplicate frame.

11. The method of claim 1, wherein the R-TAG includes a sequence number field that is generated for each message segment of a stream of packets.

* * * * *